US011135462B2

(12) United States Patent
Zhou

(10) Patent No.: US 11,135,462 B2
(45) Date of Patent: Oct. 5, 2021

(54) TRAMPOLINE

(71) Applicant: Suzhou High-Ten Sports Equipment Co., Ltd., Zhangjiagang (CN)

(72) Inventor: Jie Zhou, Zhangjiagang (CN)

(73) Assignee: Suzhou High-Ten Sports Equipment Co., Ltd., Zhangjiagang (CN)

( * ) Notice: Subject to any disclaimer, the term of this patent is extended or adjusted under 35 U.S.C. 154(b) by 0 days.

(21) Appl. No.: 16/887,968

(22) Filed: May 29, 2020

(65) Prior Publication Data

US 2020/0384301 A1  Dec. 10, 2020

(30) Foreign Application Priority Data

Jun. 4, 2019 (CN) .......................... 201920827698.2

(51) Int. Cl.
*A63B 5/11* (2006.01)
*A63B 71/00* (2006.01)

(52) U.S. Cl.
CPC ............ *A63B 5/11* (2013.01); *A63B 71/0054* (2013.01); *A63B 2209/023* (2013.01)

(58) Field of Classification Search
CPC . A63B 5/11; A63B 71/0054; A63B 2209/023; A63B 71/022; A63B 2210/50; A63B 2208/12; A63B 2225/30; A63B 2209/02; A63B 71/023; A63B 2071/009; A63B 2209/026; F16B 7/0433; F16B 7/0486; F16B 7/1472
See application file for complete search history.

(56) References Cited

U.S. PATENT DOCUMENTS

| | | | |
|---|---|---|---|
| 9,283,419 B2* | 3/2016 | Chen | A63B 71/022 |
| 9,492,698 B2* | 11/2016 | Andon | A63B 5/11 |
| 9,545,532 B2* | 1/2017 | Miller | A63B 71/022 |
| 10,265,562 B2 | 4/2019 | Woodman | A63B 5/11 |
| 10,434,350 B2* | 10/2019 | Chen | A63B 71/04 |
| 10,610,717 B2* | 4/2020 | Chen | A63B 5/11 |
| 2002/0137598 A1* | 9/2002 | Publicover | A63B 5/11 482/27 |
| 2008/0269020 A1* | 10/2008 | Alexander | A63B 5/11 482/29 |

(Continued)

FOREIGN PATENT DOCUMENTS

| | | |
|---|---|---|
| CN | 109646864 A | 4/2019 |
| EP | 1633447 B1 | 9/2017 |

*Primary Examiner* — Garrett K Atkinson
(74) *Attorney, Agent, or Firm* — Chen Yoshimura LLP

(57) ABSTRACT

A trampoline has a side frame supported by support legs, multiple fiberglass guardrail poles joined to the side frame or the support legs, and a guardrail netting held open by the guardrail poles. Each guardrail pole includes two fiberglass rods joined together by a connector that includes two nested securing tubes, where two respective ends of the two fiberglass rods are inserted in the internal securing tube. The external securing tube is secured outside of the internal securing tube. The guardrail netting has multiple securing fabric sleeves stitched to its top end. Each sleeve has a first part with a sealed top and a width matching that of a wider top section of the fiberglass guardrail pole, and a second part connected to the first part with a width matching that of the fiberglass guardrail pole, where the second part has a gap in the middle.

20 Claims, 6 Drawing Sheets

(56) References Cited

U.S. PATENT DOCUMENTS

| | | | | |
|---|---|---|---|---|
| 2014/0274570 A1* | 9/2014 | Chen | .................... | A63B 5/11 |
| | | | | 482/27 |
| 2015/0051049 A1* | 2/2015 | Andon | .................... | A63B 5/11 |
| | | | | 482/29 |
| 2015/0157889 A1* | 6/2015 | Miller | .................... | A63B 71/023 |
| | | | | 482/27 |
| 2015/0190666 A1* | 7/2015 | Chen | .................... | A63B 71/022 |
| | | | | 482/29 |
| 2016/0296781 A1* | 10/2016 | Andon | .................... | A63B 5/11 |
| 2017/0216702 A1* | 8/2017 | Valle | .................... | A63B 63/00 |
| 2017/0319938 A1* | 11/2017 | Chen | .................... | A63B 71/022 |
| 2017/0326399 A1* | 11/2017 | Woodman | .................... | A63B 5/11 |
| 2018/0147434 A1* | 5/2018 | Ji | .................... | A63B 5/11 |
| 2018/0236343 A1* | 8/2018 | Chen | .................... | A63B 71/022 |
| 2018/0256931 A1* | 9/2018 | Chen | .................... | A63B 71/022 |
| 2018/0290000 A1* | 10/2018 | Chen | .................... | A63B 71/0054 |

\* cited by examiner

TRAMPOLINE

BACKGROUND OF THE INVENTION

Field of the Invention

The present invention relates to the field of sports equipment, in particular being a type of trampoline.

Description of Related Art

Trampolines of the prior art generally include: side-frame tubes, guardrail tubes, support-leg tubes and guardrail netting; referring to Chinese patent application 201910159273.3, the guardrail tubes are rigid tubes, the tops of the guardrail tubes possessing ball-shaped sections, the top of the guardrail netting being tied to the ball-shaped sections of the guardrail tubes using cords, thus stretching out the guardrail netting, this being a trampoline structure that has the following flaws: 1. Trampolines that have guardrail netting are generally for use by children; while children are bouncing around within the trampoline, they often pull on the guardrail netting; as a result of the guardrail tubes being rigid tubes, after a period of use it is common to find that the guardrail netting has been pulled off the guardrail tubes, making it necessary to change the guardrail netting; 2. In the prior art, the connecting structures of this type of guardrail netting result in the guardrail netting being in a relatively loose state, making it less attractive.

In view of this, it is an object of the present invention to provide a type of trampoline that resolves the above-mentioned technical issues.

SUMMARY

In order to resolve the above-mentioned technical issues, the present invention provides a type of trampoline incorporating fiberglass rods capable of extending the useful life of the guardrail netting.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve the above objects, the present invention provides a trampoline incorporating fiberglass rods, which includes: a plurality of guardrail poles, a plurality of side-frame tubes, a plurality of support-leg tubes, a guardrail netting, and a plurality of connecting pieces, the guardrail poles, the side-frame tubes and the support-leg tubes being connected together by the connecting pieces, wherein each of the plurality of guardrail poles includes an upper fiberglass rod, a lower fiberglass rod, an internal securing tube, and an external securing tubes; wherein of the upper fiberglass rod and the lower fiberglass rod, a first one is connected to the internal securing tube by welding, and a second one is housed within the internal securing tube, the external securing tube fitting over an outside of the internal securing tube; wherein a stop section is provided on the external securing tube which reaches and connects to the internal securing tube or the upper fiberglass rod or the lower fiberglass rod, wherein the guardrail netting includes a plurality of securing fabric sleeves stitched to the top of the guardrail netting, the top of each upper fiberglass rod having a ball-shaped section, each securing fabric sleeve including a first constituent part matching the ball-shaped section, and a second constituent part matching the upper fiberglass rod, a width of the first constituent part being larger than a width of the second constituent part, the second constituent part defining a gap opening in a middle of the second constituent part, wherein each connecting piece includes a lower securing tube and a securing component, a bottom end of each lower fiberglass rod being contained within the lower securing tube and secured to the lower securing tube by the securing component.

In some embodiments, the stop section is a set screw or a narrower section of the external securing tube.

In some embodiments, the internal securing tubes, the external securing tubes and the lower securing tubes are metal tubes.

In some embodiments, each of the connecting pieces is T-shaped, and includes a first tube body configured to contain a section of one or more of the side-frame tubes and a second tube body configured to contain a section of one of the support-leg tubes, the first tube body and second tube body being welded together and being in a mutually vertical arrangement.

In some embodiments, the securing component includes a threaded bolt, and the lower securing tube is provided with a threaded bore with a corresponding thread which is arranged to receive the threaded bolt, wherein a head of the threaded bolt is provided with a knob.

In some embodiments, the threaded bolt comprises a threaded portion, which is arranged to engage the corresponding thread of the threaded bore, wherein the maximum diameter of the knob is at least 2.5 times larger than the maximum diameter of the threaded portion of the threaded bolt.

In some embodiments, the securing fabric sleeves are manufactured from fibers with a fiber number ≥600 D.

In some embodiments, the ball-shaped sections are plastic components, adhesively bonded to the tops of the fiberglass rods using glue.

In some embodiments, the bottoms of the lower securing tubes have a sealed structure.

In another aspect, the present invention provides a trampoline which includes: a horizontally disposed side frame having a closed circular or polygonal shape; a plurality of support legs disposed below and joined to the side frame; a plurality of guardrail poles, each joined at its lower end to the side frame or one of the support legs; and a guardrail netting having a cylindrical shape, connected at its bottom end to the side frame or the support legs and at its top end to top ends of the guardrail poles, wherein each of the plurality of guardrail poles includes an upper fiberglass rod, a lower fiberglass rod, an internal securing tube, and an external securing tube, wherein a lower end of the upper fiberglass rod and an upper end of the lower fiberglass rod are disposed within the internal securing tube, wherein the lower end of the upper fiberglass rod or the upper end of the lower fiberglass rod is affixed to the internal securing tube, wherein the external securing tube is disposed over an outside of the internal securing tube, and wherein the external securing tube includes a stop section which contacts the internal securing tube or the upper fiberglass rod or the lower fiberglass rod.

In some embodiments, the trampoline further includes a plurality of connecting pieces configured to join the side frame to the support legs, wherein each of the plurality of connecting pieces includes a lower securing tube disposed at an angle that points radially outwardly as it extends upwardly, wherein a bottom end of each lower fiberglass rod is retained within the lower securing tube.

In some embodiments, each of the plurality of connecting pieces is T-shaped, and includes a first tube body configured to contain a section of the side frame and a second tube body configured to contain a section of one of the support legs, wherein the first tube body and second tube body are welded together and being in a mutually vertical arrangement, and wherein the lower securing tube is welded to the first tube body or the second tube body.

In some embodiments, each of the plurality of connecting pieces further includes a securing component configured to secure the bottom end of the lower fiberglass rod to the lower securing tube, wherein the securing component includes a threaded bolt, wherein the lower securing tube has a threaded bore with a corresponding thread which is arranged to receive the threaded bolt, wherein the threaded bolt includes a threaded portion, which is arranged to engage the corresponding thread of the threaded bore, wherein a head of the threaded bolt includes a knob, and wherein a maximum diameter of the knob is at least 2.5 times larger than a maximum diameter of the threaded portion of the threaded bolt.

In another aspect, the present invention provides a trampoline which includes: a horizontally disposed side frame having a closed circular or polygonal shape; a plurality of support legs disposed below and joined to the side frame; a plurality of fiberglass guardrail poles, each joined at its bottom end to the side frame or one of the support legs, each fiberglass guardrail pole having a wider section located at its top end; and a guardrail netting having a cylindrical shape, connected at its bottom end to the side frame or the support legs, the guardrail netting having a plurality of securing fabric sleeves stitched to a top end of the guardrail netting, wherein each of the securing fabric sleeves has a first constituent part with a sealed top end and a width matching a width of the wider section of the fiberglass guardrail pole, and a second constituent part connected to the first constituent part and having a width matching a width of the fiberglass guardrail pole, the width of the first constituent part being larger than the width of the second constituent part, wherein the second constituent part defines a gap in its middle section.

In some embodiments, each fiberglass guardrail pole includes at least one fiberglass rod, and wherein the wider section is a ball-shaped member formed of a plastic material and adhesively bonded to a top of the fiberglass rod.

Compared to the prior art trampolines, the trampoline of the present embodiment possesses the following technical advantages: fiberglass rods acting as the guardrail poles of the trampoline not only allow the entire guardrail netting to be opened out, but also make it more attractive; additionally, when children within the trampoline pull on the guardrail netting, the elasticity that fiberglass rods possess absorbs the energy from such pulling, thus preventing the pulling on the safety netting from causing damage, and greatly improving the useful life of the safety netting; apart from this, due to an arrangement whereby there are two layers of tube in the area in which the upper fiberglass rods and lower fiberglass rods connect, the strength of that connection is greatly improved, thus greatly enhancing the useful life of the trampoline.

BRIEF DESCRIPTION OF THE DRAWINGS

In FIGS. 1 to 4: 1. guardrail pole; 10. upper fiberglass rod; 100. ball-shaped section; 11. lower fiberglass rod; 12. internal securing tube; 13. external securing tube; 130. stop section; 131. throat; 2. side-frame tube; 3. support-leg tube; 4. guardrail netting; 5. connecting piece; 50. first tube body; 51. second tube body; 52. lower securing tube; 6. securing fabric sleeve; 60. first constituent part; 61. second constituent part. 62. gap.

DETAILED DESCRIPTION OF PREFERRED EMBODIMENTS

Figure 1:
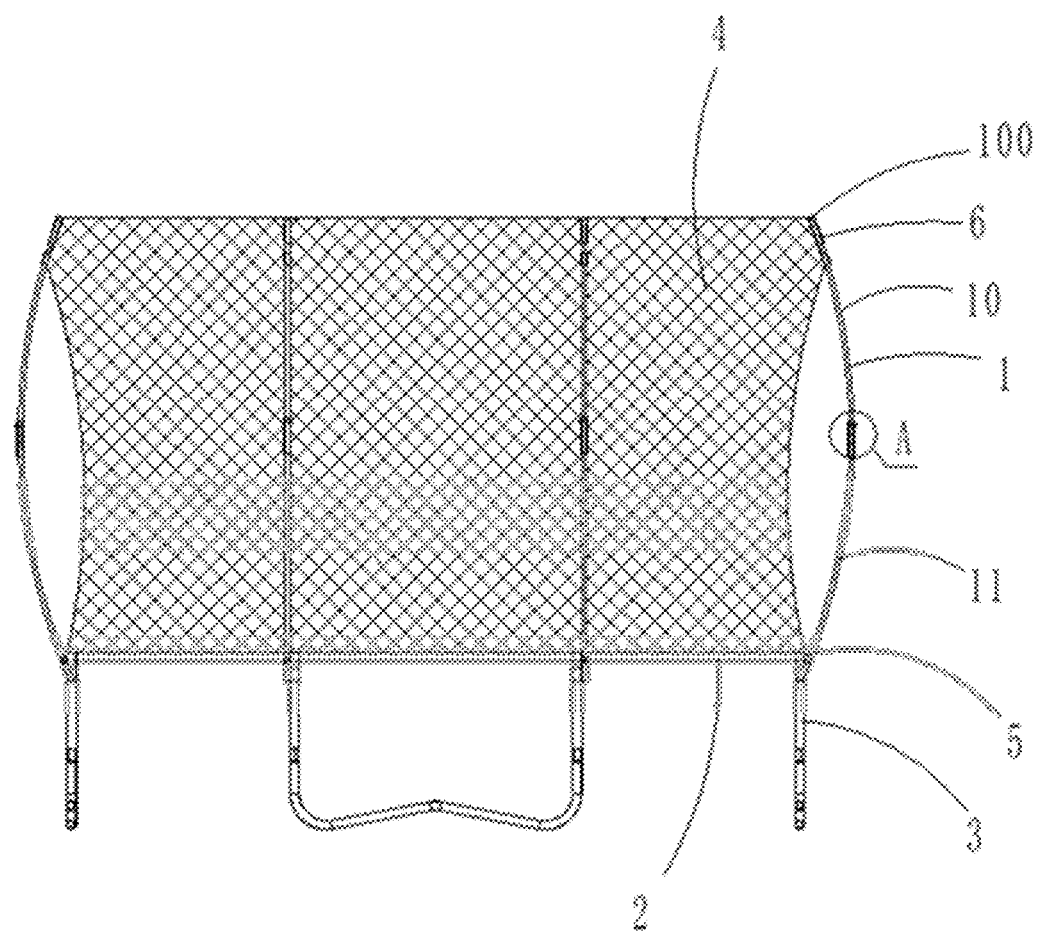
FIG. 1 is a structural representation of a trampoline according to an embodiment of the present invention.
Figure 2:
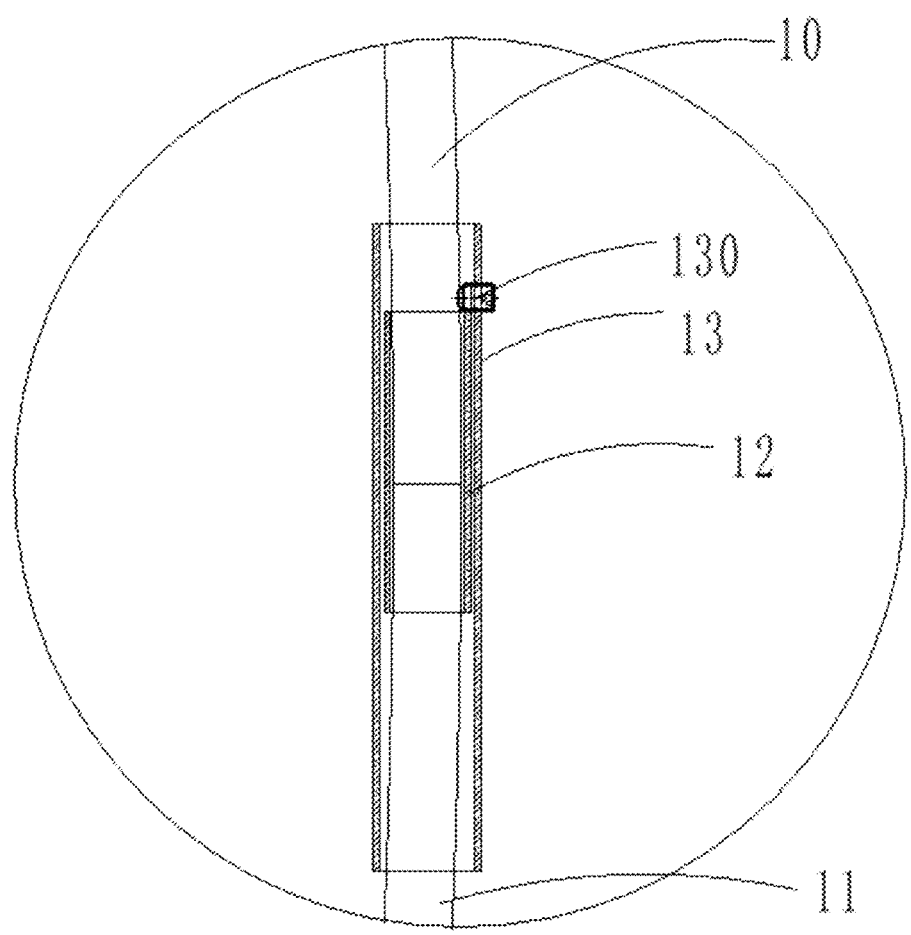
FIG. 2 is a magnified image of portion A in FIG. 1.

The following provides a further detailed description of examples of a trampoline incorporating fiberglass rods in accordance with embodiments of the invention.

Embodiment 1

With reference to FIGS. 1 to 4, a type of trampoline incorporating fiberglass rods, includes: guardrail poles 1, side-frame tubes 2, support-leg tubes 3 and guardrail netting 4, the guardrail poles 1, side-frame tubes 2 and support-leg tubes 3 being connected together via connecting pieces 5. The side-frame tubes 2 are disposed horizontally and joined to each other to form a horizontally disposed side frame which may have a closed circular or polygonal shape in the top view. The support-leg tubes 3 form support legs below the side frame which support the side frame. The support legs may have any suitable shape. A suitable number (six in the illustrated example) of guardrail poles 1 are located around the circumference of the trampoline, preferably evenly spaced. The guardrail poles extend generally upwards from the connecting pieces 5. The connecting pieces 5 are T-shaped, and are comprised of a first tube body 50 for the purpose of housing the side-frame tubes 2 and a second tube body 51 for the purpose of housing the support-leg tubes 3, the first tube body 50 and second tube body 51 being welded together and being in a mutually vertical arrangement, with the first tube body 50 being horizontal and the second tube body 51 being vertical.

Each guardrail pole includes: an upper fiberglass rod 10, a lower fiberglass rod 11, and an internal securing tube 12 and an external securing tube 13 for the purpose of connecting the upper fiberglass rod 10 and the lower fiberglass rod 11. In this embodiment, the lower end of the upper fiberglass rod 10 is affixed to the internal securing tube 12, for example by welding, and the upper end of the lower fiberglass rod is removably inserted within the internal securing tube 12 to allow the two rods to be assembled for installation and disassembled for packaging or storage. Of course, in other embodiments, the upper end of the lower fiberglass rod 11 may be affixed the internal securing tube 12, for example by welding, and the lower end of the upper fiberglass rod 10 may be removably inserted within the internal securing tube 12, also allowing the realization of this invention. The external securing tube 13 fits over the exterior of the internal securing tube 12, there being stop sections 130 provided on the external securing tube 13 which reaches and/or connects to the internal securing tube 12, the upper fiberglass rod 10, or the lower fiberglass rod 11. In this embodiment, the stop section 130 is a set screw which passes through a threaded bore in the external securing tube, the set screw located above the internal securing tube 12 and abuts the upper end surface of the internal securing tube (shown in FIG. 2). Alternatively (not shown), the set screw may push tightly against the side of the internal securing tube 12, the upper fiberglass rod 10, or the lower fiberglass rod 11, to prevent the external securing tube 13 from sliding down.

A number of securing fabric sleeves 6 are stitched onto the top of the guardrail netting 4, corresponding to the number and position of the guardrail poles 1. The securing fabric sleeves 6 may be manufactured from fibers with a fiber number ≥600 D. The guardrail netting 4 has a generally cylindrical shape and its bottom end is secured to the side frame and/or the support legs by suitable structures such as ties, webbings, snaps, etc.

Figure 3:
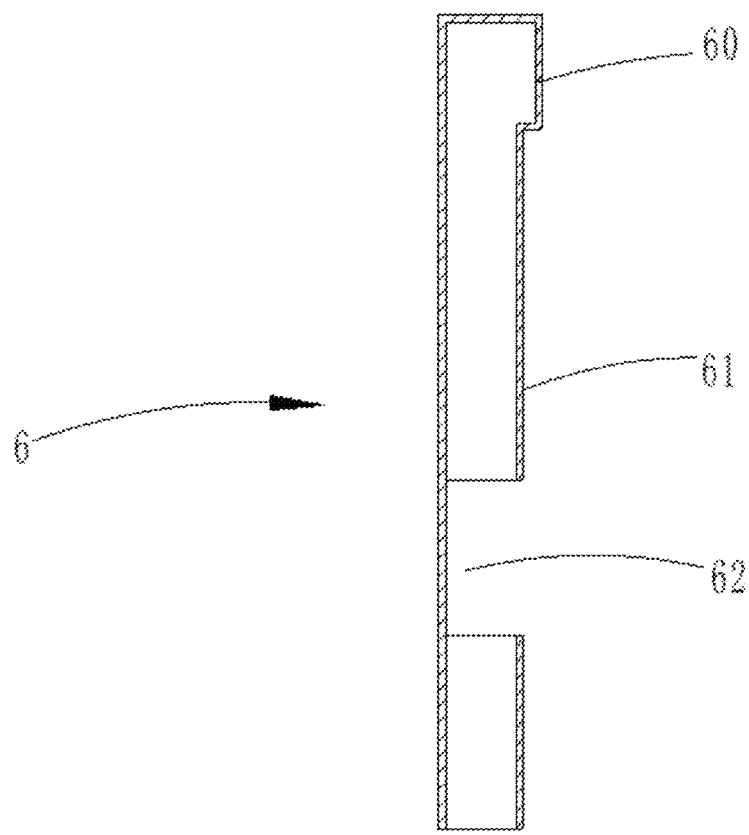
FIG. 3 is a structural representation of the securing fabric sleeve.

The top of the upper fiberglass rod 10 possesses a ball-shaped section 100 which has a larger diameter than that of the upper fiberglass rod 10, the ball-shaped section 100 being preferably a plastic component, which is preferably adhesively bonded to the top of the upper fiberglass rod 10 using glue. The securing fabric sleeve 6 includes a first constituent part 60 having a width that matches that of the ball-shaped section 100, and a second constituent part 61 having a width that matches that of the upper fiberglass rod 10, the width of the first constituent part 60 being larger than the width of the second constituent part 61. The first constituent part 60 has a sealed top, and the first and second constituent parts are connected together forming a sleeve. There is a gap 62 in the middle of the second constituent part 61 and extending partially around the circumference of the sleeve. After assembly, the ball-shaped section 100 is housed within the first constituent part 60 and the sealed top of the first constituent part rests on the ball-shaped section, and an end section of the upper fiberglass rod 10 is disposed in the second constituent part 61. Due to the width of the second constituent part 61 being less than that of the first constituent part 60, the ball-shaped section 100 cannot fall off the first constituent part 60, and even if it does fall off the first constituent part 60, the ball-shaped section 100 would fall into the gap 62 and protrude out of the sleeve, and would not slide completely out of the second constituent part 61. Here, note that the orientation shown in FIG. 3 is such that the center of the trampoline is located to the left of the securing fabric sleeve 6 (i.e., the gap 62 faces the outside of the trampoline), so the pulling force by the guardrail netting 4 would be to the left, causing the ball-shaped section 100 to protrude out of the sleeve from the gap 62 when the ball-shaped section 100 falls out of the upper section of the first constituent part 60. With a securing fabric sleeve 6 structure of this type, there are two lines of defense for preventing the ball-shaped section 100 from sliding out, thus greatly improving the reliability of its connection without requiring additional securing structures such as ties.

Each connecting piece 5 further includes a lower securing tube 52 welded onto the tubes 50 or 51, the bottoms of the lower securing tubes 52 having a sealed structure. The bottom ends of the lower fiberglass rods 11 are housed within the lower securing tubes 52 and secured using securing components. In this embodiment, the internal securing tubes 12, external securing tubes 13 and lower securing tubes 52 are all steel tubes; of course in other embodiments, the internal securing tubes 12, external securing tubes 13 and lower securing tubes 52 may be tubes of some other metal, also allowing this invention to be realized.

Embodiment 2

Figure 5:
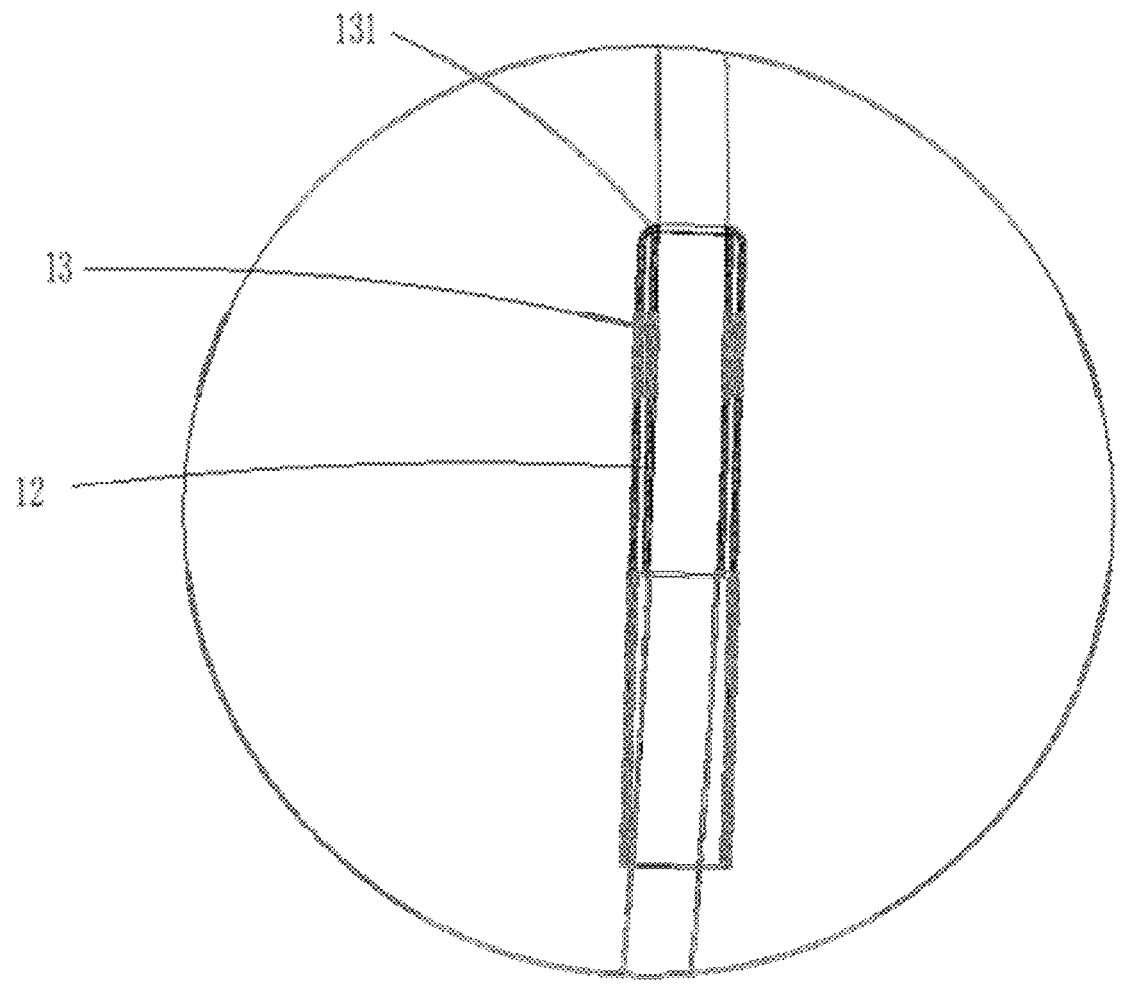
FIG. 5 shows the connecting structures of the external securing tubes, internal securing tubes and fiberglass rods according to another embodiment of this invention.

Referring to FIG. 5, in this embodiment the remaining structures are the same as in embodiment 1, except for the structure of the external securing tubes; in this embodiment, there is a throat 131 located at the top of the external securing tube, the throat having am inner diameter that is smaller than the outer diameter of the internal securing tube, the external securing tube 13 being in a nested and sleeved arrangement outside of the internal securing sleeve 12, the throat 131 reaching and contacting the surface of the top end of the internal securing tube 12. By this structure, the external securing tube 13 is prevented from sliding down along the lower fiberglass rods 11 and therefore retained around the internal securing sleeve 12, also allowing this invention to be realized.

Figure 4:
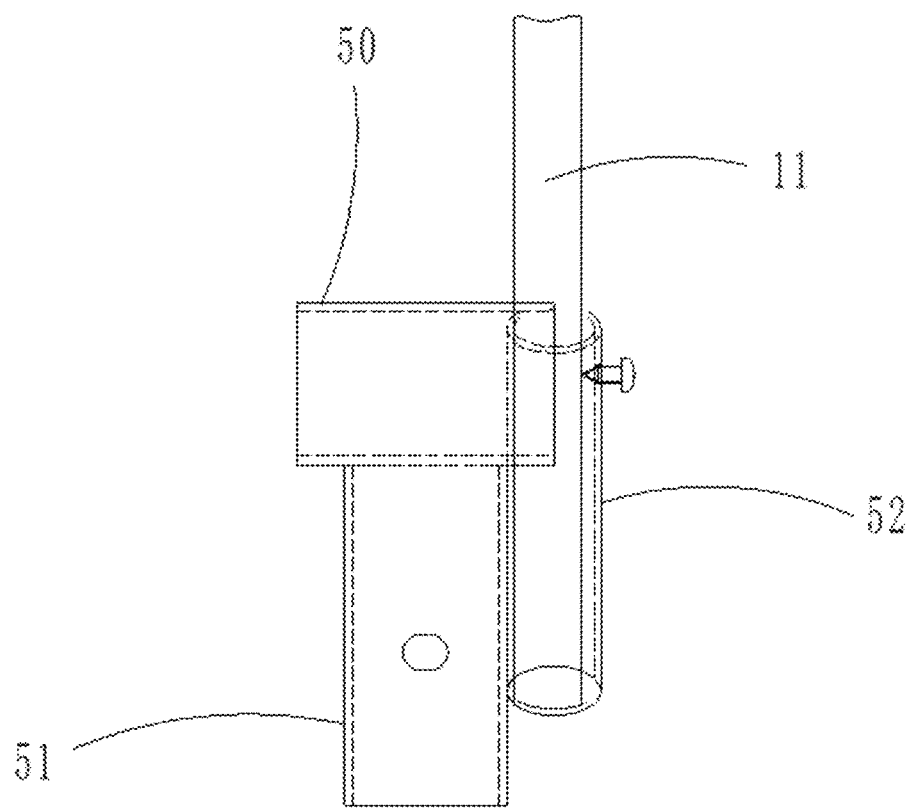
FIG. 4 is a structural representation of the connecting piece.
Figure 6:
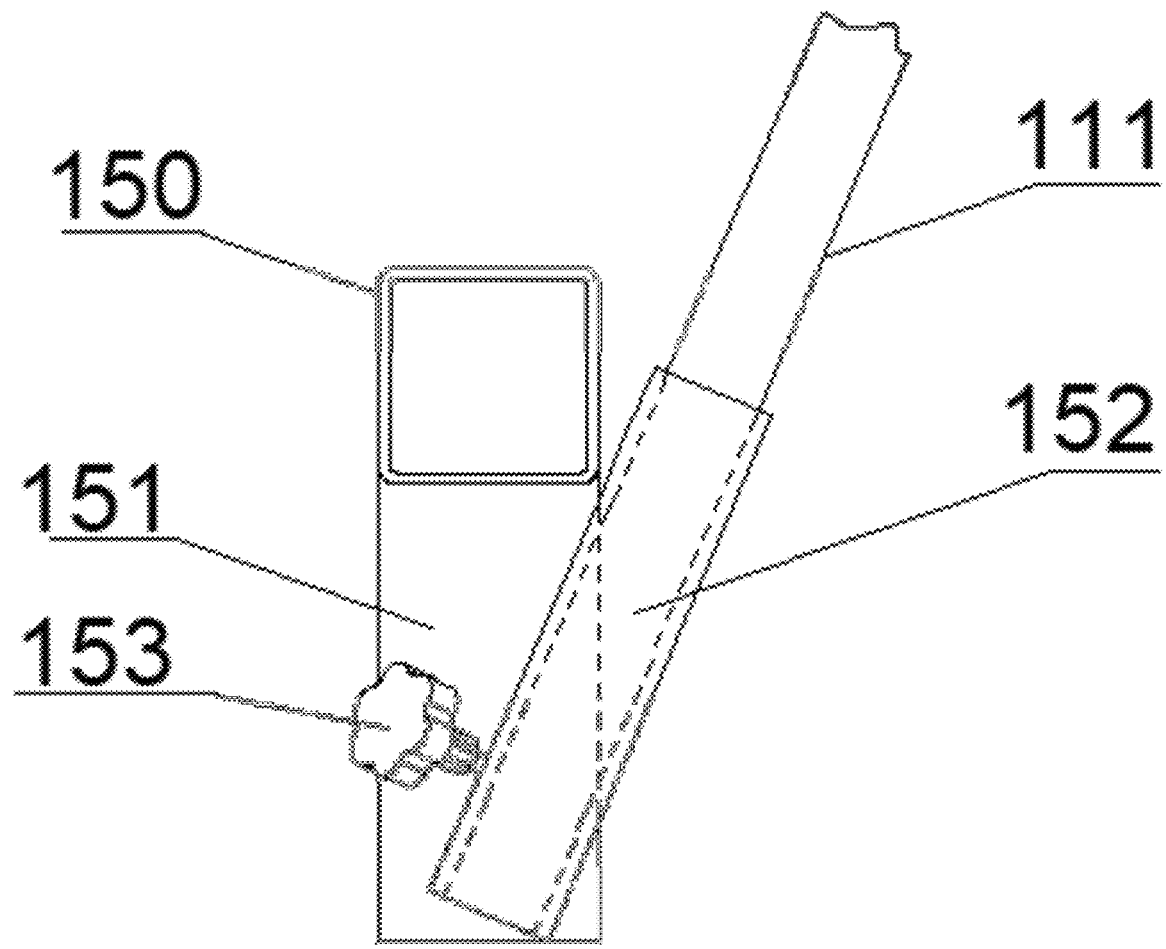
FIG. 6 shows an alternative connecting piece to the connecting piece shown in FIG. 4.

Referring to FIG. 6, there is shown an alternative connecting piece to the connecting piece 5 shown in FIG. 4. Note that while FIG. 4 is a view along a radial direction of the side frame of the trampoline, FIG. 6 is a view along a tangential direction of the side frame. The connecting piece shown in FIG. 6 is applicable to all the embodiments mentioned above. As shown the connecting piece of FIG. 6 includes a first tube body 151, which is attachable to a portion of a side-frame tube 2. In the depicted example, the first tube body 151 comprises first and second ends, and the first end is provided with a first opening 150, which is arranged to receive a male projection projecting from the portion of the side-frame tube 2 so that the portion of the side frame tube can become attached to the first tube body 151. Alternatively, the connecting piece may be T-shaped like the connecting piece of FIG. 4, and include a cross tube provided at the first end of the first tube body 151. The cross tube may comprise an internal bore arranged to receive the portion of the side-frame tube in use.

Returning to the depicted example, the first tube body 151 is arranged to be attached to the support leg tube 3. A portion of the support leg tube 3 may be inserted into a second opening provided at the second end of the first tube body 151 to press fit the portion of the support leg tube 3 within the first tube body 151.

Attached to the first tube body 151 is a securing tube 152, which serves the same function as the securing tube 52 in FIG. 4, i.e., to retain the lower end of the fiberglass guardrail pole. Preferably, the securing tube 152 is welded onto the first tube body 151. However, other fastening means such as a nut and bolt arrangement may be employed to attach the securing tube 152 to the first tube body 151.

The securing tube 152 is arranged to house therein the bottom end of a lower fiberglass rod 111 in use (the lower fiberglass rod 111 is similar to the lower fiberglass rod 11 of FIG. 4). To securely fix the lower fiberglass rod 111 within the securing tube 152, a securing component 153 is provided. In the depicted example, the securing component 153 is a threaded bolt with a threaded portion and a head portion. The securing tube 152 has a threaded bore (not shown) with a thread which corresponds to the thread of the threaded portion of the threaded bolt. The threaded bore is thus arranged to receive the threaded bolt 153.

The head portion of the threaded bolt 153 is provided with a knob. The knob is arranged such that it has a maximum diameter which is at least 2.5 times greater than the maximum diameter of the threaded portion of the threaded bolt. Preferably, the knob is arranged such that it has a maximum diameter which is at least 4 times greater than the maximum diameter of the threaded portion of the threaded bolt. Preferably, the knob comprises thermoplastic.

In use, the knob is gripped by the user and rotated to insert the bolt into the threaded bore to push the lower fiberglass rod 111 against an internal surface of the securing tube 152 so as to secure the lower fiberglass rod 111 in position within the securing tube 152.

The advantage of employing a securing component 153 with a threaded bolt having a knob is that the user does not need to use an Allen key to tighten the bolt as it is inserted into the threaded bore to secure the fiberglass rod 111 in position inside the securing tube 152 in use. This makes the trampoline easier to assemble for the user.

As seen in FIGS. 1 and 6, the bottom section of each guardrail pole 1 points radially outwardly (as it extends upwardly), due to the orientation of the securing tube 52 or 152. Here, note that in the orientation of FIG. 6, which is a view along a tangential direction of the trampoline, the center of the trampoline is located to the left of the connecting piece, and the securing tube 152 is angled radially outwardly as it extends upwardly; while in FIG. 4, which is a view along a radial direction of the trampoline, the securing tube 52 is also angled (in or out of the plane of the drawing sheet) but the angle cannot be seen in this view. This orientation of the bottom section of the guardrail pole 1, together with the fact that the top diameter of the guardrail netting 4 is approximately the same as that of the side frame, causes the fiberglass guardrail poles 1 to bend into a bow shape, as seen in FIG. 1. As a result, due to the resilience of the fiberglass material, the guardrail poles maintain a tension in the guardrail netting 4 to keep it opened out.

It should also be noted that the connected two-piece structure of the guardrail poles 1 as described above, in addition to making the trampoline easier to package in the disassembled state, has the advantage of making the guardrail poles more rigid and therefore providing more tension to the guardrail netting 4. The connector structure that employs the internal and external securing tubes, as described above, enhances the strength of the connection and serves to further increase the rigidity of the guardrail poles. In this regard, the length of the external and/or internal securing tubes influence the amount of additional rigidity.

Because the fiberglass guardrail poles can bend, there is a somewhat increased risk of the sleeve of the guardrail netting 4 being pulled off of the top of the guardrail poles. Therefore, the structure of the fabric sleeve 6 described above serves an important function of providing a more secure retention of the guardrail netting on the guardrail poles.

To summarize the above, fiberglass rods act as the guardrail poles of the trampoline of the invention, which not only allows the entire guardrail netting to be opened out, but also makes it more attractive; additionally, when children within the trampoline pull on the guardrail netting, the elasticity that fiberglass rods possess absorbs the energy from such pulling, thus preventing the pulling on the safety netting from causing damage, thus greatly improving the useful life of the safety netting; apart from that, by this invention having an arrangement whereby there are two layers of tube in the area in which the upper fiberglass rods and lower fiberglass rods connect, the strength of that connection is greatly improved, thus greatly improving the useful life of the trampoline.

The above embodiments are only to provide a description of the innovative principles and effects of the present invention, and applications of some of its embodiments, and do not constitute a restriction of the invention; it should be pointed out that, a person skilled in the art would be capable of making a number of modifications and improvements to the invention, and where these do not depart from the innovative thinking behind this invention, these shall all fall within the scope of protection of this invention.

What is claimed is:

1. A trampoline incorporating fiberglass rods, comprising:
a plurality of guardrail poles, a plurality of side-frame tubes, a plurality of support-leg tubes, a guardrail netting, and a plurality of connecting pieces, the guardrail poles, the side-frame tubes and the support-leg tubes being connected together by the connecting pieces,
wherein each of the plurality of guardrail poles includes an upper fiberglass rod, a lower fiberglass rod, an internal securing tube, and an external securing tubes; wherein of the upper fiberglass rod and the lower fiberglass rod, a first one is connected to the internal securing tube by welding, and a second one is housed within the internal securing tube, the external securing tube fitting over an outside of the internal securing tube; wherein a stop section is provided on the external securing tube which reaches and connects to the internal securing tube or the upper fiberglass rod or the lower fiberglass rod,
wherein the guardrail netting includes a plurality of securing fabric sleeves stitched to the top of the guardrail netting, the top of each upper fiberglass rod having a ball-shaped section, each securing fabric sleeve including a first constituent part matching the ball-shaped section, and a second constituent part matching the upper fiberglass rod, a width of the first constituent part being larger than a width of the second constituent part, the second constituent part defining a gap opening in a middle of the second constituent part,
wherein each connecting piece includes a lower securing tube and a securing component, a bottom end of each lower fiberglass rod being contained within the lower securing tube and secured to the lower securing tube by the securing component.

2. The trampoline incorporating fiberglass rods according to claim 1, wherein the stop section is a set screw or a narrower section of the external securing tube.

3. The trampoline incorporating fiberglass rods according to claim 1, wherein the internal securing tubes, the external securing tubes and the lower securing tubes are metal tubes.

4. The trampoline incorporating fiberglass rods according to claim 1, wherein each of the connecting pieces is T-shaped, and includes a first tube body configured to contain a section of one or more of the side-frame tubes and a second tube body configured to contain a section of one of the support-leg tubes, the first tube body and second tube body being welded together and being in a mutually vertical arrangement.

5. The trampoline incorporating fiberglass rods according to claim 1, wherein the securing component includes a threaded bolt, and the lower securing tube is provided with a threaded bore with a corresponding thread which is arranged to receive the threaded bolt, wherein a head of the threaded bolt is provided with a knob.

6. The trampoline incorporating fiberglass rods according to claim 5, wherein the threaded bolt comprises a threaded portion, which is arranged to engage the corresponding thread of the threaded bore, wherein the maximum diameter of the knob is at least 2.5 times larger than the maximum diameter of the threaded portion of the threaded bolt.

7. The trampoline incorporating fiberglass rods according to claim 1, wherein the securing fabric sleeves are manufactured from fibers with a fiber number ≥600 D.

8. The trampoline incorporating fiberglass rods according to claim 1, wherein the ball-shaped sections are plastic components, adhesively bonded to the tops of the fiberglass rods using glue.

9. The trampoline incorporating fiberglass rods according to claim 1, wherein the bottoms of the lower securing tubes have a sealed structure.

10. A trampoline comprising:
a horizontally disposed side frame having a closed circular or polygonal shape;
a plurality of support legs disposed below and joined to the side frame;
a plurality of guardrail poles, each joined at its lower end to the side frame or one of the support legs; and
a guardrail netting having a cylindrical shape, connected at its bottom end to the side frame or the support legs and at its top end to top ends of the guardrail poles,
wherein each of the plurality of guardrail poles includes an upper fiberglass rod, a lower fiberglass rod, an internal securing tube, and an external securing tube, wherein a lower end of the upper fiberglass rod and an upper end of the lower fiberglass rod are disposed within the internal securing tube, wherein the lower end of the upper fiberglass rod or the upper end of the lower fiberglass rod is affixed to the internal securing tube, wherein the external securing tube is disposed over an outside of the internal securing tube, and wherein the external securing tube includes a stop section which contacts the internal securing tube or the upper fiberglass rod or the lower fiberglass rod.

11. The trampoline of claim 10, wherein the stop section is a set screw or a narrower section of the external securing tube which is has an inner diameter smaller than an outer diameter of the internal securing tube.

12. The trampoline of claim 10, further comprising a plurality of connecting pieces configured to join the side frame to the support legs, wherein each of the plurality of connecting pieces includes a lower securing tube disposed at an angle that points radially outwardly as it extends upwardly, wherein a bottom end of each lower fiberglass rod is retained within the lower securing tube.

13. The trampoline of claim 12, wherein each of the plurality of connecting pieces is T-shaped, and includes a first tube body configured to contain a section of the side frame and a second tube body configured to contain a section of one of the support legs, wherein the first tube body and second tube body are welded together and being in a mutually vertical arrangement, and wherein the lower securing tube is welded to the first tube body or the second tube body.

14. The trampoline of claim 12, wherein each of the plurality of connecting pieces further includes a securing component configured to secure the bottom end of the lower fiberglass rod to the lower securing tube,
wherein the securing component includes a threaded bolt, wherein the lower securing tube has a threaded bore with a corresponding thread which is arranged to receive the threaded bolt, wherein the threaded bolt includes a threaded portion, which is arranged to engage the corresponding thread of the threaded bore, wherein a head of the threaded bolt includes a knob, and wherein a maximum diameter of the knob is at least 2.5 times larger than a maximum diameter of the threaded portion of the threaded bolt.

15. The trampoline of claim 12, wherein the lower securing tube has a sealed bottom.

16. The trampoline of claim 12, wherein the internal securing tubes, the external securing tubes and the lower securing tubes are formed of metal.

17. A trampoline comprising:
a horizontally disposed side frame having a closed circular or polygonal shape;
a plurality of support legs disposed below and joined to the side frame;
a plurality of fiberglass guardrail poles, each joined at its bottom end to the side frame or one of the support legs, each fiberglass guardrail pole having a wider section located at its top end; and
a guardrail netting having a cylindrical shape, connected at its bottom end to the side frame or the support legs, the guardrail netting having a plurality of securing fabric sleeves stitched to a top end of the guardrail netting,
wherein each of the securing fabric sleeves has a first constituent part with a sealed top end and a width matching a width of the wider section of the fiberglass guardrail pole, and a second constituent part connected to the first constituent part and having a width matching a width of the fiberglass guardrail pole, the width of the first constituent part being larger than the width of the second constituent part, wherein the second constituent part defines a gap in its middle section.

18. The trampoline of claim 17, wherein the securing fabric sleeves are manufactured from fibers with a fiber number ≥600 D.

19. The trampoline of claim 17, wherein each fiberglass guardrail pole includes at least one fiberglass rod, and wherein the wider section is a ball-shaped member formed of a plastic material and adhesively bonded to a top of the fiberglass rod.

20. The trampoline of claim 17, further comprising a plurality of connecting pieces configured to join the side frame to the support legs, wherein each of the plurality of connecting pieces includes a lower securing tube disposed at an angle that points radially outwardly as it extends upwardly, wherein a bottom end of each fiberglass guardrail pole is retained within the lower securing tube.

* * * * *